United States Patent
Weiss et al.

(10) Patent No.: US 9,342,683 B2
(45) Date of Patent: *May 17, 2016

(54) STATELESS ATTESTATION SYSTEM

(71) Applicant: Intel Corporation, Santa Clara, CA (US)

(72) Inventors: Yoav Weiss, Petach Tikva (IL); Etay Bogner, Zippori (IL)

(73) Assignee: Intel Corporation, Santa Clara, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/913,104

(22) Filed: Jun. 7, 2013

(65) Prior Publication Data

US 2013/0276081 A1 Oct. 17, 2013

Related U.S. Application Data

(63) Continuation of application No. 12/348,357, filed on Jan. 5, 2009, now Pat. No. 8,474,037.

(60) Provisional application No. 61/019,360, filed on Jan. 7, 2008.

(51) Int. Cl.
    *G06F 21/44* (2013.01)
    *G06F 21/57* (2013.01)

(52) U.S. Cl.
    CPC .............. *G06F 21/44* (2013.01); *G06F 21/577* (2013.01)

(58) Field of Classification Search
    CPC ................................ G06F 21/44; G06F 21/577
    See application file for complete search history.

(56) References Cited

U.S. PATENT DOCUMENTS

| | | | |
|---|---|---|---|
| 6,167,448 A | 12/2000 | Hemphill et al. | |
| 6,931,446 B1 | 8/2005 | Cox et al. | |
| 7,047,377 B2 | 5/2006 | Elder et al. | 711/162 |
| 7,107,463 B2 | 9/2006 | England et al. | |
| 7,210,169 B2 | 4/2007 | Smith et al. | |

(Continued)

FOREIGN PATENT DOCUMENTS

| | | |
|---|---|---|
| WO | 2008018055 A2 | 2/2008 |
| WO | 2008114257 A2 | 9/2008 |

OTHER PUBLICATIONS

Sarmenta, Luis FG, et al. "Virtual monotonic counters and count-limited objects using a TPM without a trusted OS." Proceedings of the first ACM workshop on Scalable trusted computing. (pp. 27-42). ACM, 2006.*

(Continued)

*Primary Examiner* — Kari Schmidt
(74) *Attorney, Agent, or Firm* — Blakely, Sokoloff, Taylor & Zafman LLP

(57) ABSTRACT

A method includes assessing a trustworthiness level of a user computer by communication between the user computer and a first server. A record indicating the trustworthiness level is sent from the first server to the user computer, for storage by the user computer. A request is sent from the user computer to a second server, different from the first server, for a service to be provided to the user computer by the second server. The record is provided from the user computer to the second server by communicating between the user computer and the second server. At the second server, the trustworthiness level is extracted from the record, and the requested service is conditionally allowed to be provided to the user computer depending on the extracted trustworthiness level.

14 Claims, 3 Drawing Sheets

(56) References Cited

U.S. PATENT DOCUMENTS

| | | | |
|---|---|---|---|
| 7,302,698 B1 | 11/2007 | Proudler et al. | 726/2 |
| 7,424,610 B2* | 9/2008 | Ranganathan | 713/164 |
| 2002/0029276 A1 | 3/2002 | Bendinelli et al. | |
| 2002/0119427 A1 | 8/2002 | Brown et al. | 434/1 |
| 2002/0194482 A1 | 12/2002 | Griffin et al. | 713/176 |
| 2003/0167410 A1 | 9/2003 | Rigstad et al. | 713/201 |
| 2004/0039924 A1* | 2/2004 | Baldwin et al. | 713/189 |
| 2004/0054901 A1 | 3/2004 | England et al. | 713/168 |
| 2005/0033980 A1 | 2/2005 | Willman et al. | |
| 2005/0114683 A1 | 5/2005 | Jin et al. | |
| 2005/0132031 A1 | 6/2005 | Sailer et al. | |
| 2005/0138384 A1* | 6/2005 | Brickell et al. | 713/182 |
| 2005/0221766 A1 | 10/2005 | Brizek et al. | |
| 2005/0223221 A1 | 10/2005 | Proudler et al. | |
| 2006/0017953 A1 | 1/2006 | Ly et al. | |
| 2006/0026423 A1* | 2/2006 | Bangerter et al. | 713/164 |
| 2006/0130071 A1 | 6/2006 | Martin et al. | |
| 2006/0230438 A1 | 10/2006 | Shappir et al. | |
| 2007/0044143 A1 | 2/2007 | Zhu et al. | |
| 2007/0061887 A1 | 3/2007 | Hoover et al. | |
| 2007/0101400 A1 | 5/2007 | Freeman et al. | 726/2 |
| 2007/0143629 A1 | 6/2007 | Hardjono et al. | 713/189 |
| 2007/0168375 A1 | 7/2007 | Yu | |
| 2007/0198214 A1* | 8/2007 | Bade et al. | 702/182 |
| 2007/0244833 A1* | 10/2007 | Camenisch | 705/71 |
| 2007/0260866 A1 | 11/2007 | Wang et al. | 713/2 |
| 2007/0261125 A1 | 11/2007 | Ginter et al. | |
| 2007/0271618 A1 | 11/2007 | Chao et al. | |
| 2007/0300220 A1 | 12/2007 | Seliger et al. | |
| 2008/0040470 A1 | 2/2008 | Bogner | |
| 2008/0040478 A1 | 2/2008 | Bogner et al. | |
| 2008/0059804 A1 | 3/2008 | Shah et al. | 713/186 |
| 2008/0077993 A1* | 3/2008 | Zimmer et al. | 726/27 |
| 2008/0114844 A1 | 5/2008 | Sanchez et al. | |
| 2008/0209544 A1 | 8/2008 | Kempka | 726/17 |
| 2008/0235779 A1 | 9/2008 | Bogner | |
| 2008/0235794 A1 | 9/2008 | Bogner | |
| 2009/0043971 A1 | 2/2009 | Kim | 711/150 |
| 2009/0049297 A1 | 2/2009 | Omernick et al. | 713/158 |
| 2009/0049510 A1 | 2/2009 | Zhang et al. | 726/1 |
| 2009/0100272 A1 | 4/2009 | Smeets | 713/189 |
| 2009/0164377 A1 | 6/2009 | Aissi | 705/50 |
| 2010/0154037 A1 | 6/2010 | Sabin et al. | 726/5 |
| 2010/0218236 A1 | 8/2010 | Hardjono et al. | 726/3 |

OTHER PUBLICATIONS

Garriss, Scott, et al. "Towards trustworthy kiosk computing." Mobile Computing Systems and Applications, 2007. HotMobile 2007. Eighth IEEE Workshop on. (pp. 41-45). IEEE, 2007.*
International Application PCT/IL2008/00382 Search Report dated Jan. 5, 2009.
International Application PCT/IB2009/052347 Search Report dated Oct. 20, 2009.
Trusted Computing Group (TCG), "TPM Main Part 1 Design Principles", Specification Version 1.2 Level 2 Revision 103, Jul. 9, 2007.
International Application PCT/IL2007/000954 Preliminary Report on Patentability dated Apr. 23, 2009.
International Application PCT/IL2007/000954 Search Report dated Aug. 5, 2008.
International Application PCT/IL2007/000019 Search Report date May 18, 2009.
Bogner, E., U.S. Appl. No. 12/477,187 "Secure mult-purpose computing client" filed Jun. 3, 2009.

* cited by examiner

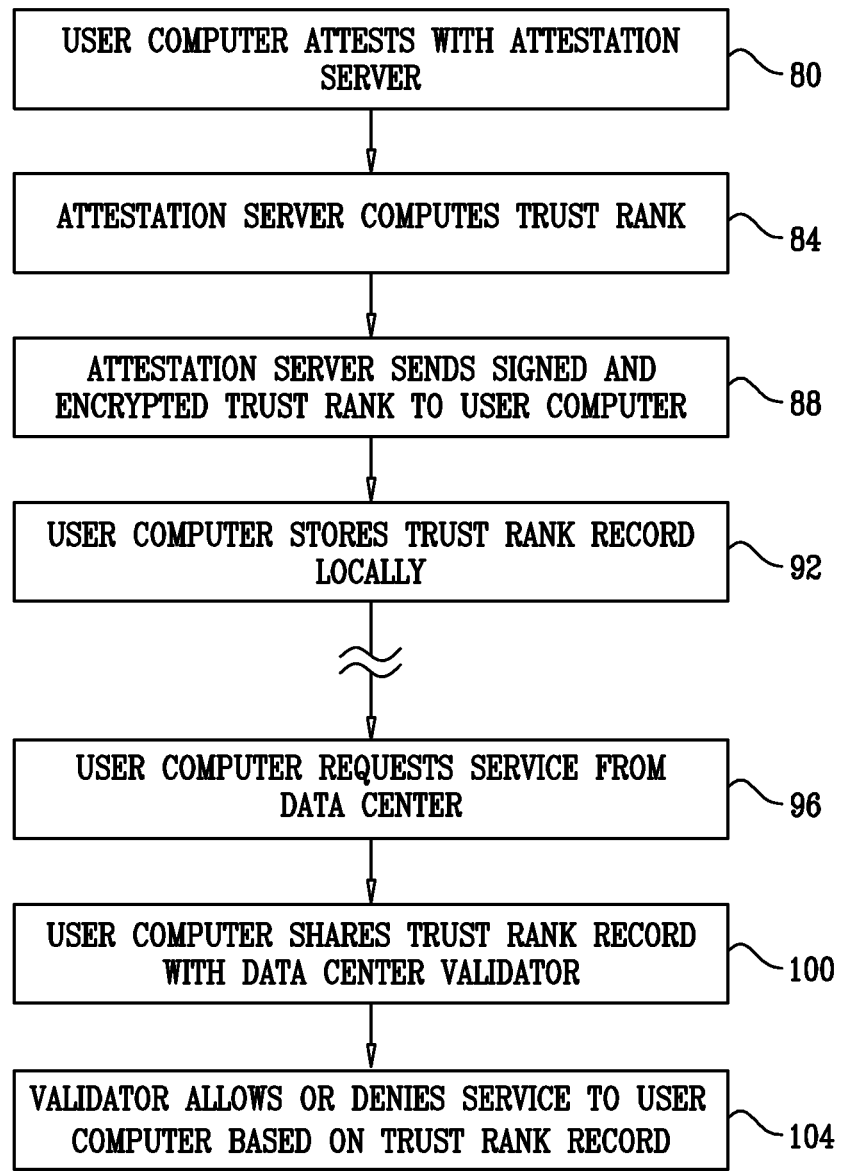

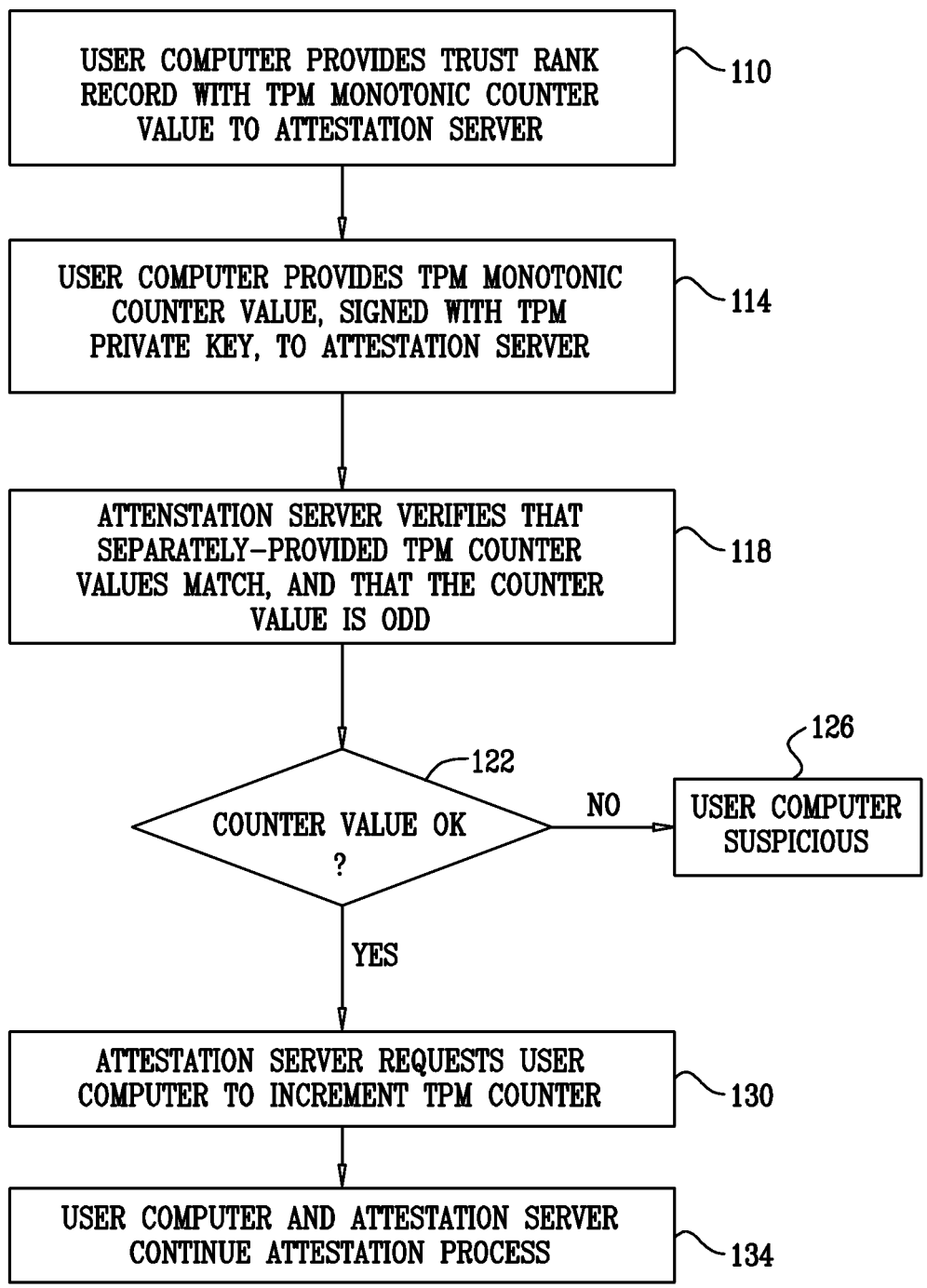

STATELESS ATTESTATION SYSTEM

CROSS-REFERENCE TO RELATED APPLICATIONS

This application is a Continuation of, and claims the benefit of priority of U.S. patent application Ser. No. 12/348,357, filed Jan. 5, 2009 and entitled: "Stateless Attestation System," now U.S. Pat. No. 8,474,037, which in turn claims the benefit of priority of U.S. Provisional Patent Application 61/019,360, filed Jan. 7, 2008, both of which are incorporated herein by reference.

FIELD OF THE INVENTION

The present invention relates generally to computer networks, and particularly to methods and systems for secure communication over data communication networks.

BACKGROUND OF THE INVENTION

Various applications allow users to interact with a computer system of an organization over the Internet or other public network. Such applications are often referred to as extranet applications. For example, extranet applications enable users to carry out financial transactions with organizations such as banks or insurance companies and make purchases using electronic commerce (e-commerce) web-sites. Employees can access organization data remotely over the Internet, and physicians can access medical records maintained by health institution database systems.

Communication security is often a prime consideration in the design and deployment of extranet applications, especially since extranet communication traffic traverses a public network and since user computers are often not under the control of the organization. Several methods and systems for increasing the security of extranet communication are known in the art. In particular, some security methods and systems attempt to verify the integrity of the operating environment of a server or user computer, i.e., verify that the operating environment has not been corrupted or tampered with. For example, U.S. Patent Application Publication 2005/0221766, whose disclosure is incorporated herein by reference, describes a method and apparatus for performing dynamic attestation for a communication system. Several methods for measuring and reporting the integrity of a system, such as a wireless device, are described.

U.S. Patent Application Publication 2005/0132031, whose disclosure is incorporated herein by reference, describes a system and method for providing attestation and/or integrity of a server execution environment. One or more parts of the server environment are selected for measurement. The selected parts are measured, and the measurements result in a unique fingerprint for each selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

SUMMARY OF THE INVENTION

An embodiment of the present invention provides a method, including:

assessing a trustworthiness level of a user computer by communication between the user computer and a first server;

sending a record from the first server to the user computer, for storage by the user computer, indicating the trustworthiness level;

sending a request from the user computer to a second server, different from the first server, for a service to be provided to the user computer by the second server;

providing the record from the user computer to the second server by communicating between the user computer and the second server; and at the second server, extracting the trustworthiness level from the record, and conditionally allowing the requested service to be provided to the user computer depending on the extracted trustworthiness level.

In some embodiments, the user computer runs a first operating environment for performing general-purpose operations, and a second operating environment that is configured expressly for interacting with the second server and is isolated from the first operating environment, and assessing the trustworthiness level of the user computer includes assessing the trustworthiness level of the second operating environment.

In a disclosed embodiment, assessing the trustworthiness level includes obtaining from the user computer information regarding a configuration of the user computer, and computing the trustworthiness level based on the obtained information. In an embodiment, obtaining the information includes obtaining a secure signature of at least part of an operating system of the user computer, and computing the trustworthiness level includes comparing the obtained signature to a list of legitimate signatures.

In another embodiment, sending the record includes signing the record with a secure signature by the first server. Additionally or alternatively, sending the record includes encrypting the record by the first server. Further additionally or alternatively, sending the record includes including in the record at least one parameter selected from a group of parameters consisting of a time stamp indicating a time at which the trustworthiness was assessed, a unique identifier of the user computer provided to the first server upon initial interaction with the user computer, a Platform Configuration Register (PCR) obtained from a Trusted Platform Module (TPM) in the user computer, an indication of a network location of the user computer, an identity of a user of the user computer, and an identifier of a trusted site with which the user computer communicates.

In an embodiment, assessing the trustworthiness includes obtaining from the user computer a value of a secure counter that is incremented in accordance with predefined logic during each interaction of the user computer with the first server, and sending the record includes storing the value of the secure counter in the record.

In some embodiments, the first server includes multiple first servers, and assessing the trustworthiness includes obtaining from the user computer a value of a secure counter that is incremented in accordance with predefined logic during each interaction of the user computer with the first servers, and detecting, based on the value of the secure counter, that a previous interaction of the user computer with one of the first servers was terminated abnormally. Detecting that the previous interaction was terminated abnormally may include verifying whether the value of the secure counter is an integer multiple of a predefined number. In an embodiment, obtaining the value includes obtaining from the user computer a first value of the secure counter that is stored in the record, and a second value indicating a current value of the secure counter, and detecting that the previous interaction was terminated abnormally includes comparing the first value to the second value. In some embodiments, the method includes, responsively to allowing the requested service, communicating between the user computer and the second server so as to provide the service.

There is additionally provided, in accordance with an embodiment of the present invention, a computer system, including:

one or more first servers, which are configured to assess respective trustworthiness levels of user computers, and to forward records indicating the assessed trustworthiness levels to the user computers; and a second server, separate from the first servers, which is configured to obtain the records from the user computers along with requests from the user computers for a service to be provided by the second server, to extract the trustworthiness levels from the records, and to conditionally provide the service to the user computers depending on the extracted trustworthiness levels.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for stateless attestation of a user computer, in accordance with an embodiment of the present invention; and FIG. 3 is a flow chart that schematically illustrates a method for securing a stateless attestation process, in accordance with an embodiment of the present invention.

DETAILED DESCRIPTION OF EMBODIMENTS

Overview

Figure 1:
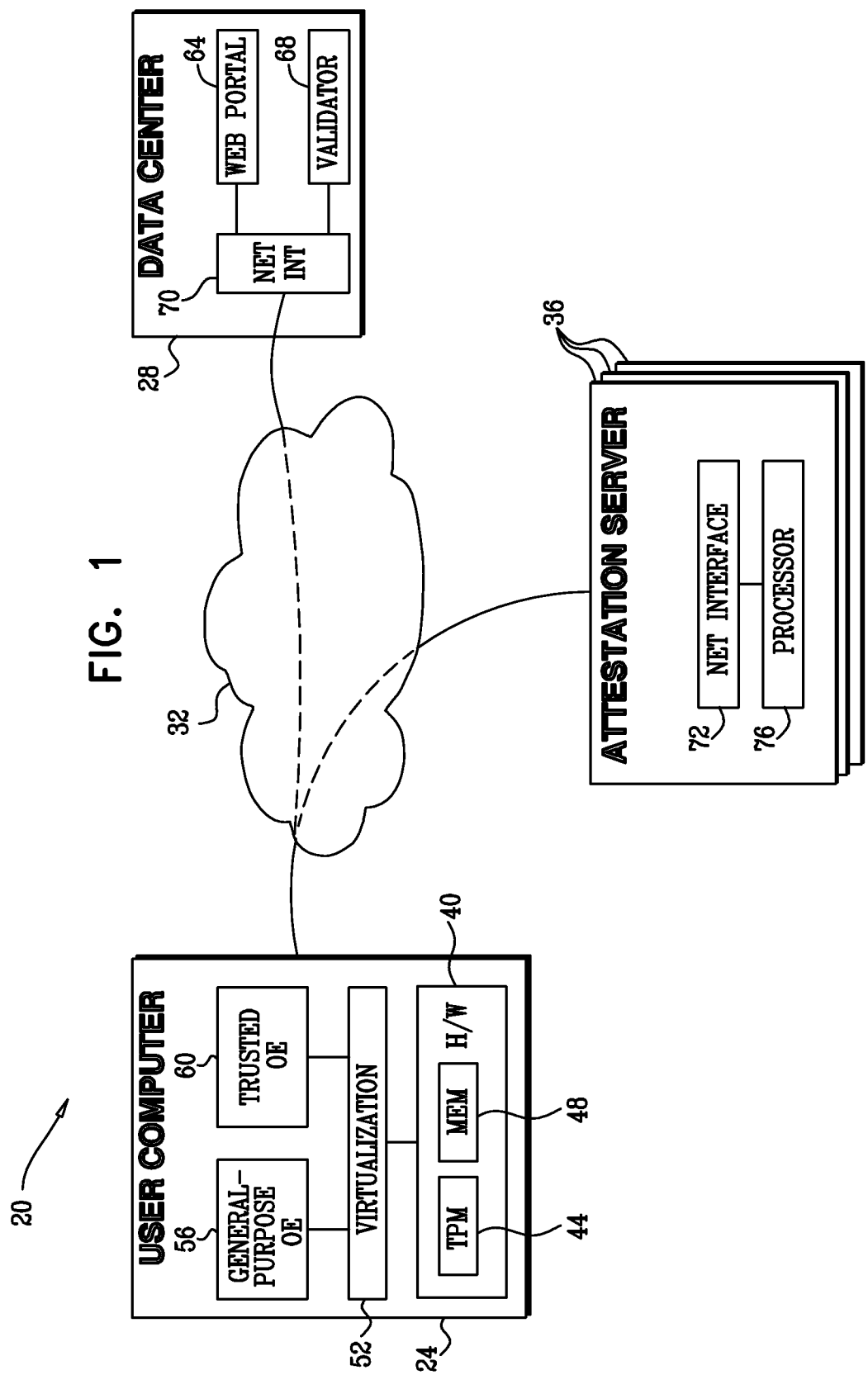
FIG. 1 is a block diagram that schematically illustrates a system for stateless attestation of user computers, in accordance with an embodiment of the present invention.

In a typical extranet application, multiple user computers interact with a data center over a network. In many such applications, it is important for the data center to verify that the user computers are trustworthy, i.e., not corrupted by viruses, impersonation attacks or other security threats. Embodiments of the present invention that are described hereinbelow provide improved methods and systems for verifying the trustworthiness of user computers. The methods and systems described herein are stateless and fully distributed, meaning that no central entity is used for storing or otherwise processing trustworthiness-related information.

In some embodiments, the trustworthiness of the user computers is assessed by one or more attestation servers, which conduct various kinds of tests on the user computers. When a certain attestation server has assessed the trustworthiness level of a given user computer, the attestation server produces a record indicating the trustworthiness level. The server forwards the record to the user computer, and the user computer stores the record locally in memory. When the user computer contacts the data center in order to request a certain service, the computer provides the locally-stored record to the data center. The data center extracts the trustworthiness level from the record provided by the user computer, and decides whether to allow or deny the service request based on the extracted trustworthiness level.

Since each user computer stores the record of its trustworthiness level locally, there is no need to store such information in any sort of central database or other centralized storage or processing entity. All of the information that is needed for the data center to verify the trustworthiness of a given user computer is stored locally in that computer, and is provided to the data center on demand. As such, the attestation methods and systems described herein are stateless and distributed, and are therefore particularly suitable for large data centers that serve large numbers of user computers.

Moreover, the attestation processes described herein may be provided by multiple attestation servers. The use of multiple attestation servers further enhances the scalability of the attestation process, and provides a high degree of resilience to failures and malicious attacks on the attestation servers.

When multiple attestation servers are deployed in such a stateless, distributed manner, the lack of centralized coordination among the attestation servers and/or a shared database may cause the attestation process to be sensitive to circumvention attempts. For example, a certain user computer may attempt to circumvent the attestation process by initiating the process with one attestation server, studying its behavior, disconnecting from this server and continuing the process with another attestation server. Methods for detecting and preventing such attempts are described herein.

System Description

FIG. 1 is a block diagram that schematically illustrates a system 20 for stateless attestation of user computers, in accordance with an embodiment of the present invention. In system 20, a user computer 24 interacts with a server, such as a data center 28. Data center 28 may comprise, for example, an e-commerce web-site, a computer system of a financial institution or other organization, a database server and/or any other suitable computing platform that interacts with users or clients. The data center may provide various services to user computer 24, depending on the specific data center application. Data center 28 may comprise one or more computing platforms. Data center users may comprise, for example, customers, suppliers, employees or partners of the organization.

User computer 24 may comprise a personal computer, a mobile computing/communication device or any other suitable user terminal. In the context of the present patent application and in the claims, the term "user computer" is used broadly and refers to any type of computing platform that is capable of communicating over a network. Although FIG. 1 shows only a single user computer for the sake of clarity, a typical system comprises multiple users connected to the data center at any given time. As will be explained below, the methods described herein provide a high level of scalability and are particularly suitable for large scale systems, although they can be used with computer systems of any size.

User computer 24 and data center 28 communicate over a communication network 32. Network 32 may comprise a Wide Area Network (WAN), such as the Internet, a Metropolitan Area Network (MAN), a Local Area Network (LAN), a wired or wireless data network, or any other suitable network or combination of network types. Typically, at least part of network 32 is public.

In many data center applications, it is important for data center 28 to verify that any user computer 24 with which it interacts is trustworthy. For example, it is important to verify that the user computer is not infected by a virus, an impersonation attack or other security risk. For this purpose, system 20 comprises one or more attestation servers 36. A given attestation server 36 communicates with user computer 24 and verifies its trustworthiness. Each attestation server 36 comprises a network interface 72 for communicating with user computers 24 over network 32, and a processor 76 that carries out the attestation functions described herein.

Typically, the attestation server conducts various kinds of tests on the user computer, and computes an attestation result (e.g., a trustworthiness level or trust rank). The attestation server sends the attestation result to the user computer, which stores it locally. The attestation result stored in the user computer may be signed and/or encrypted in order to ensure its authenticity. When the user computer subsequently interacts with data center 28 in order to request a certain service, the data center uses the locally-stored attestation result in order to verify that the user computer is trustworthy. The data center may allow or deny service to the user computer based on this verification, as well as take additional measures if the user computer is regarded as non-trustworthy.

Since each user computer stores its respective attestation results locally, there is no need to store such information in any sort of central database or other centralized storage or processing entity. All of the information that is needed by the data center in order to verify the trustworthiness of a given user computer is stored locally in that computer, and can be provided to the data center on demand. This sort of attestation process is stateless and distributed, and is therefore highly efficient in large scale computer systems that serve large numbers of user computers.

In the context of the attestation and authentication processes described herein, the data center can be viewed as partitioned into two separate entities. In the example of FIG. 1, data center 28 comprises a server, such as a web portal 64, which provides data center services to user computers 24. The data center further comprises a validator 68, which verifies the trustworthiness of the user computers using the attestation results stored locally in these computers. The web portal and the validator connect to network 32 via a network interface 70. The web portal and validator may run on a single computing platform or on different platforms.

In some embodiments, system 20 comprises multiple attestation servers 36, each of which is capable of verifying the trustworthiness of user computers 24. The attestation servers may be collocated or distributed geographically, as desired. Employing a large number of attestation servers provide a high degree of scalability, as well as resilience to failures and malicious attacks (e.g. Distributed Denial of Service (DDoS) attacks) on the attestation servers.

User computer 24 comprises hardware 40, typically comprising one or more Central Processing Unit (CPU) devices, memory devices and any other suitable components or subsystems normally found in computing platforms. In particular, hardware 40 comprises a memory 48 for storing the attestation results of the user computer, as computed and provided by attestation server 36.

In some embodiments, user computer 24 comprises a Trusted Platform Module (TPM) 44. The TPM typically comprises a hardware device that is capable of generating machine-specific cryptographic keys or other secure information for authenticating the computer in which it is installed. TPMs are specified, for example, by the Trusted Computing Group™ (TCG) in TCG TPM Specification Version 1.3, Revision 103, Jul. 9, 2007, which is incorporated herein by reference. The role of TPM 44 in the stateless attestation process is described further below.

In some embodiments (although not necessarily), computer 24 runs two operating environments in parallel. In these embodiments, a General-Purpose Operating Environment (GPOE) 56 runs the different applications of the computer, other than the extranet application (i.e., the application that interacts with data center 28). A Trusted Operating Environment (TOE) 60 is configured expressly for communicating with the data center. GPOE 56 and TOE 60 are decoupled, or isolated, from one another. In other words, the behavior, configuration and performance of one operating environment have little or no effect on the behavior, configuration and performance of the other.

In some embodiments, user computer 24 comprises a virtualization layer 52, which allocates hardware resources and other resources of computer 24 to the GPOE and TOE. Any suitable virtualization means, which may be implemented in hardware and/or software, can be used for this purpose. In some embodiments, the GPOE and TOE run on separate "virtual CPUs" managed by the virtualization layer.

In some embodiments, the tests conducted by the attestation servers attempt to detect situations in which the TOE has been corrupted or modified. Since the exclusive task of the TOE is communicating with the data center, and since it typically has a fixed configuration, reliable detection of deviations from normal behavior, configuration and/or performance is feasible. Further aspects of operating security measures using a GPOE and a TOE are addressed in PCT International Publication WO 2008/018055, entitled "Extranet Security," whose disclosure is incorporated herein by reference. In some embodiments, the attestation tests also examine other elements of the user computer, such as various elements of the POE, the virtualization layer, the computer's Basic Input-Output System (BIOS) and/or bootloader, or any other suitable element.

In some embodiments, the configuration of the TOE may not be entirely fixed, and the TOE may perform certain minor tasks other than communication with the data center. Thus, the terms "fixed configuration" and "configured expressly for interacting with the data center" are meant to describe a situation in which the effect of any additional tasks carried out by the TOE is sufficiently minor, such that the TOE configuration is sufficiently fixed to allow reliable detection of anomalous behavior or performance.

Typically, the CPU or CPUs in user computer 24, web portal 64 and validator 68 in data center 28, and/or processors 76 of attestation servers 36, comprise general-purpose processors, which is programmed in software to carry out the functions described herein. The software may be downloaded to the processors in electronic form, over a network, for example, or it may, alternatively or additionally, be provided and/or stored on tangible media, such as magnetic, optical, or electronic memory.

Attestation Method Description

FIG. 2 is a flow chart that schematically illustrates a method for stateless attestation of a user computer, in accordance with an embodiment of the present invention. The method begins with a given attestation server 36 performing attestation tests on a given user computer 24, at a testing step 80. The attestation server may conduct any suitable test for assessing the trustworthiness of the user computer or parts thereof (e.g., the trustworthiness of the TOE, if one is used). For example, the attestation server may request the user computer to provide information related to specific elements of the computer, e.g., information related to the configuration of the user computer. Typically, the attestation server requests information that has been generated by TPM 44 of the user computer.

For example, in some embodiments the TPM generates a secure signature of the BIOS of the user computer. The attestation server may request the user computer to provide its BIOS signature, and compare it to a list of known and legitimate BIOS signatures. If the BIOS signature provided by the user computer matches one of the legitimate signatures in the list, the attestation server may regard this match as a positive indication as to the trustworthiness of the user computer. Alternatively, the attestation server may run any other suitable test.

The attestation server may conduct attestation tests on user computers at any appropriate time, e.g., at periodic time intervals or in response to any suitable event occurring in the user computer. In some embodiments, the attestation server may produce interim results during the test procedure, and final results when the test procedure is completed. Both interim and final results are regarded herein as attestation results.

In some embodiments, the attestation server computes a trust rank of the user computer, at a rank computation step 84. The trust rank, which is viewed as an example of an attestation result, comprises a numerical value that quantifies the level of trust attributed by the attestation server to the user computer. The trust rank may be binary (i.e., a trustworthy/non-trustworthy indication) or it may have multiple values.

The attestation server forwards the attestation results (e.g., the trust rank) to the user computer, at a result forwarding step 88. The user computer stores an attestation record comprising the attestation results locally in memory 48, at a local storage step 92. Typically, the attestation server employs various measures to prevent the attestation record stored in the user computer from being forged.

In some embodiments, each attestation server has a unique security certificate, which is signed by a common Certification Authority (CA). Such a CA is often referred to as an attestation CA. The attestation server may sign the attestation record with this unique certificate, or with any other suitable secure signature. Additionally or alternatively, the attestation server may encrypt the attestation record with a unique encryption key.

In some embodiments, the TPM in the user computer comprises a monotonic counter, which is incremented at the beginning and end of each attestation session with an attestation server. In an embodiment, the attestation server adds the current value of this counter to the attestation record. The counter value indicates whether the user computer has completed its attestation process properly, or whether the attestation process was terminated abnormally. An example of a protection process that is based on this mechanism is described in FIG. 3 below.

In another embodiment, the attestation server may add to the attestation record a time stamp, indicating the time at which the attestation results were calculated. Additionally or alternatively, the attestation server may receive from the user computer a unique identifier of the computer at the beginning of the attestation test procedure. The attestation server may add this unique identifier to the attestation record.

In some embodiments, the attestation server may add to the attestation record one or more Platform Configuration Registers (PCRs) that are provided by the user computer's TPM, so as to attest the configuration of the computer. In an embodiment, the attestation server may add to the attestation record an Internet Protocol (IP) address and/or any other information indicative of the location from which the user computer connects to network 32. Other information that may be added to the attestation record may comprise, for example, information related to the identity of the end user of the user computer, or information regarding the trusted site to which the user or user computer wishes to connect. Further additionally or alternatively, the attestation server may include in the attestation record any other suitable information that assists in attesting the trustworthiness of the user computer. As noted above, the attestation record may pertain to interim or to final attestation results.

At some point in time, the user computer may initiate contact with data center 28 in order to request a certain service from web portal 64, at a service requesting step 96. In order to enable the data center to verify the trustworthiness of the user computer, the user computer provides its latest attestation record to validator 68 of the data center, at a record forwarding step 100. The data center validator processes the attestation results and decides whether to regard the user computer as trustworthy or not, at a trust decision step 104. If the validator concludes, based on the attestation results, that the user computer is trustworthy, it allows the web portal to provide the requested service to the user computer. Otherwise, the request is denied. If allowed, the web portal communicates with the user computer so as to provide the requested service.

The user computer may share the attestation record with the data center validator in various ways. For example, in some embodiments the user computer communicates with the data center by establishing a Secure Socket Layer (SSL) connection. In these embodiments, the user computer communicates with an SSL gateway (not shown in the figures) in the data center. The user computer may deliver the attestation record using a Hyper-Text Transfer Protocol (HTTP) cookie, in which case the web portal or the SSL gateway process the cookie and extract the attestation results.

Alternatively, the user computer may set a separate communication connection with validator 68 for transferring the attestation record. In these configurations, the validator communicates with the web portal or SSL gateway, so as to notify them whether or not to allow the requested service. The user computer and the validator may communicate using protocols such as SSL.

Protecting the Attestation Process against Circumvention

FIG. 3 is a flow chart that schematically illustrates a method for securing a stateless attestation process, in accordance with an embodiment of the present invention. When system 20 comprises multiple attestation servers 36, a certain user computer (e.g., a compromised user computer) may attempt to circumvent the attestation process by initiating the process with one attestation server, studying its behavior, disconnecting from this server and continuing the process with another attestation server. Distributed, stateless systems such as system 20 may be particularly sensitive to such attacks, because of the lack of a centralized entity that coordinates the different attestation servers. The method of FIG. 3 uses the secure monotonic counter of the TPM, described above, in order to detect and prevent such attempts. Note that the methods and systems described herein do not use any sort of communication among the attestation servers.

The method of FIG. 3 assumes that the monotonic counter in the TPM is incremented once when an attestation session begins, and incremented again when the session terminates properly. Assuming that the initial value of the counter is 1 (or any other odd value), the counter will have an odd value before and after each attestation session, and an even value during the session.

The method begins with the user computer initiating an attestation session with a certain attestation server. When initiating the session, the user computer provides the attestation server with its latest attestation record, which comprises a value of its TPM monotonic counter, at a first counter reporting step 110. The attestation record provided at step 110 is typically signed, and its counter value indicates the counter value from the previous attestation session conducted by this user computer.

The user computer also provides the attestation server with the current value of the TPM counter, at a second counter reporting step 114. The counter value provided at step 114 is typically signed with a private key generated by the TPM, so as to ensure its trustworthiness.

The attestation server verifies that the two separately-provided counter values match, and that this value is odd, at a counter verification step 118. If the two counter values do not match, or if they match but the matching value is even, as checked at a decision step 122, the attestation concludes that the user computer has aborted its previous attestation session (e.g., with another attestation server) abnormally. In such a case, the attestation server declares the user computer suspicious and takes appropriate measures, at a suspicious termination step 126. Typically, the attestation server assigns this user computer a lower trust rank.

(In some embodiments, a single event in which the counter values do not match (i.e., a single event in which an attestation session was terminated abnormally) does not necessarily declare the user computer as non-trustworthy. In some cases, an attestation session may terminate abnormally because of reasons that are unrelated to the trustworthiness of the user computer, such as power failures or temporary network outages. These events are typically rare. Therefore, in some embodiments, the attestation records stored in a given user computer keep track of multiple previous attestation sessions conducted by the user computer. In these embodiments, the attestation servers may consider these multiple attestation records in assessing the trustworthiness of the user computer. For example, a user computer that has abnormally aborted an exceedingly high number of attestation sessions can be regarded as non-trustworthy. On the other hand, a user computer having only a single abnormally-aborted session in its recent history may still be trusted.)

Otherwise, i.e., if the two values match and the matching value is odd, the attestation server requests the user computer to increment its TPM counter value and to submit its new value, at an incrementing step 130. At this point the counter value is even, indicating that the attestation session is in progress. The user computer and the attestation server continue the attestation process, as described above, at an attestation step 134. When the session is completed, the attestation server requests the user computer to increment its TPM counter value again, causing the counter value to be odd.

In some embodiments, the method of FIG. 3 may be carried out without testing of odd/even value of the TPM counter. In these embodiments, the attestation server checks only if the two counter values provided at steps 110 and 114 match.

The use of odd and even values of the monotonic counter is an example implementation, which is shown purely for the sake of conceptual clarity. In alternative embodiments, the monotonic counter can be incremented at any suitable stage of the attestation session, in accordance with any suitable predefined logic. For example, the counter can be incremented N times during a given attestation session, such that a counter value that is not an integer multiple of N can be indicative of an attestation session that was aborted abnormally, or otherwise of a session that was not terminated properly. Typically but not necessarily, N may be defined as a prime number. Further alternatively, a given attestation server can use the value of the monotonic counter in any other suitable way to detect that a previous attestation process was aborted abnormally.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method comprising:
   requesting from a user computer access to a service of a first server over a network via a first operating environment;
   receiving an attestation request from the first server, via the first operating environment, in response to requesting access to the service;
   sending from the user computer a value of a secure counter, which is incremented during each interaction of the user computer with the first server, to an attestation server to cause the attestation server to verify trustworthiness of the user computer based on the secure counter value; and
   sending a locally-stored attestation record from the user computer to the first server via a second operating environment in response to the attestation request and in response to the attestation server verifying trustworthiness of the user computer, wherein the second operating environment is isolated from the first operating environment, and wherein the attestation record is stored locally in a secure storage device accessible via the second operating environment; and
   receiving access to the service in response to the first server verifying the attestation record received from the user computer.

2. The method of claim 1, wherein sending the locally-stored attestation record further comprises:
   obtaining the record from a trusted platform module (TPM) of the user computer.

3. The method of claim 1, further comprising: the user computer sending configuration information of the user computer to the attestation server to cause the attestation server to verify trustworthiness of the user computer based on the configuration information.

4. The method of claim 3, further comprising:
   the user computer sending a secure signature to the attestation server to cause the attestation server to verify trustworthiness of the user computer based on the secure signature.

5. The method of claim 1, further comprising:
   the user computer executing the first operating environment for performing general purpose operations and the second operating environment configured exclusively for providing a secure communication session, wherein operations performed in the first operating environment do not affect operation of the second operating environment.

6. An article of manufacture comprising a non-transitory computer readable storage medium that stores instructions, which when executed cause a computing device to perform operations including:
   requesting from a user computer access to a service of a first server over a network via a first operating environment;
   receiving an attestation request from the first server, via the first operating environment, in response to requesting access to the service;

sending from the user computer a value of a secure counter, which is incremented during each interaction of the user computer with the first server, to an attestation server to cause the attestation server to verify trustworthiness of the user computer based on the secure counter value; and sending a locally-stored attestation record from the user computer to the first server via a second operating environment in response to the attestation request and in response to an attestation server verifying trustworthiness of the user computer, wherein the second operating environment is isolated from the first operating environment, and wherein the attestation record is stored locally in a secure storage device accessible via the second operating environment; and receiving access to the service in response to the first server verifying the attestation record received from the user computer.

7. The article of manufacturer of claim 6, wherein the instructions for sending the locally-stored attestation record further comprise instructions for obtaining the record from a trusted platform module (TPM) of the user computer.

8. The article of manufacture of claim 6, further comprising instructions for the user computer sending configuration information of the user computer to the attestation server to cause the attestation server to verify trustworthiness of the user computer based on the configuration information.

9. The article of manufacture of claim 8, further comprising instructions for the user computer sending a secure signature to the attestation server to cause the attestation server to verify trustworthiness of the user computer based on the secure signature.

10. The article of manufacture of claim 7, further comprising instructions for the user computer executing the first operating environment for performing general purpose operations and the second operating environment configured exclusively for providing a secure communication session, wherein operations performed in the first operating environment do not affect operation of the second operating environment.

11. A computer system comprising:

a secure storage device to store an attestation record locally at the computer system, the attestation record received from an attestation server; and a network interface device to communicate from the computer system over a network to the attestation server and a first server separate from the attestation server, the computer system configured to, via the network interface device, request from a user computer access to a service of a first server over a network via a first operating environment;

receive an attestation request from the first server, via the first operating environment, in response to requesting access to the service;

send a value of a secure counter from the user computer configured to receive the attestation record via the network interface device, which is incremented during each interaction of the user computer with the first server, to the attestation server, wherein the attestation server is to verfy trustworthiness of the computer based on the secure counter value; and send a locally-stored attestation record from the user computer to the first server via a second operating environment in response to the attestation request and is received via the network interface device in response to the attestation server verifying trustworthiness of the user computer, wherein the second operating environment is isolated from the first operating environment locally stored attestation record is previously received from an attestation server separate from the first server, and wherein the attestation record is stored locally in a secure storage device accessible via the second operating environment; and receive access to the service in response to the first server verifying the attestation record received from the user computer.

12. The computer system of claim 11, wherein the computer system is further configured to obtain the record from a trusted platform module (TPM) of the user computer to send via the network interface device.

13. The computer system of claim 11, further comprising the user computer configured to receive the attestation record via the network interface device in response to sending configuration information to the attestation server, wherein the attestation server is to verify trustworthiness of the user computer based on the configuration information.

14. The computer system of claim 13, further comprising the user computer configured to receive the attestation record via the network interface device in response to sending a secure signature to the attestation server, wherein the attestation server is to verify trustworthiness of the user computer based on the secure signature.

* * * * *